United States Patent Office 3,158,435
Patented Nov. 24, 1964

3,158,435
PROCESS FOR DYEING POLYOLEFINS
Ermanno Gaetani, Milan, Ugo Moiso, Cesano Maderno, and Sisto Papa, Milan, Italy, assignors to Montecatini Società Generale per l'Industria Mineraria e Chimica, a corporation of Italy
No Drawing. Filed Dec. 20, 1960, Ser. No. 77,002
Claims priority, application Italy Dec. 24, 1959
13 Claims. (Cl. 8—41)

The present invention relates to a process of direct dyeing of polyolefin materials. The dyed polymer may then be worked to obtain textile fibres, films or articles.

An other object of the present invention is a new class of dyes suitable to tinge the aforementioned polyolefin materials.

In our copending patent application Serial No. 22,128 is described a dyeing process by which polyolefin articles, especially polyethylene and polypropylene articles, can be directly dyed using polyazo dyes of the general formula:

$$X_1-R-N=N-R_1-N=N-(R_2-N=N-)_n-R_3X$$

wherein R, $R_1$, $R_2$ and $R_3$ are selected from the group consisting of phenyl, alkyl phenyl, halophenyl, alkyl-halophenyl, trifluoromethylphenyl, cycloalkylphenyl, oxyalkylphenyl, nitrophenyl, carboxyphenyl, amidophenyl, alkanoyloxyphenyl, naphthyl, carboxynaphthyl, alkyl-naphthyl, and tetrahydronaphthyl; $n$ represents zero or 1; X represents an hydroxyl group, an amine group or a mono- or di-substituted amino group, substituted with alkyl, oxyalkyl, alkoxyalkyl, cyanoalkyl or aryl groups; $X_1$ represents H or X.

Further investigation has now surprisingly shown that the substituent R or $R_3$ in the general formula claimed in the aforementioned patent application, can also be a heterocyclic ring, preferably pyrazolone, indazole, thiazole, benzothiazole or thiophene. $R_3$ can in addition be the radical of an open chain ketoenolic compound capable of coupling with diazocompounds, e.g., an acylacetoarylide.

An object of the present invention is to provide a satisfactory process for the direct dyeing of a synthetic material obtained by the polymerization of olefins, especially ethylene, propylene and mixtures thereof, in which process polyazo dyes having the following general formula are used:

$$X_1-R-N=N-R_1-N=N-R_2X$$

wherein $R_1$ represents an aromatic group, preferably a benzene group, either unsubstituted or substituted with alkyl, halogen, nitro or trifluoromethyl groups and/or mono- or di-alkyl substituted amino groups;

R and $R_2$ are different from $R_1$, and each represents an aromatic group, preferably a benzene group, either unsubstituted or substituted with alkyl, halogen, nitro or trifluoromethyl groups and/or mono- or di-alkyl substituted amino groups, a heterocyclic group, preferably a pyrazolone, indazole, thiazole, benzothiazole or thiophene group, either unsubstituted or substituted with alkyl, aryl, oxyalkyl, halogen trifluoromethyl or nitro groups, and an open chain ketoenolic group capable of coupling with diazo compounds, e.g., an acylacetoarylide;

X represents hydroxyl, amine, mono- or di-substituted amino groups substituted with alkyl, cyanoalkyl or aryl groups;

$X_1$ represents X or H.

It has been found, according to one aspect of this invention, that the introduction of the above mentioned heterocyclic or ketoenolic groups, thus producing compounds encompassed by the above formula, makes possible the production of dyes possessing new color shades not heretofore obtained.

A further object of the present invention is the compounds comprised in said general formula.

The following examples are given to illustrate the present invention and are not intended to limit its scope.

Example 1

22.5 g. of 4-amino-3,2'-dimethylazobenzene are diazotized in any conventional manner (e.g., as described in Saunders, The Aromatic Diazo Compounds, page 74) and the diazo-azo-compound thus obtained is added to a solution of 16.5 g. of 3-oxythionaphthene prepared with 300 ml. of water, 14 g. of conc. sodium hydroxide solution (36° Bé.) and 30 g. of 30% ammonia solution, while keeping the temperature at about 10° C.

The coupling is completed almost immediately. The dis-azo compound obtained has the formula

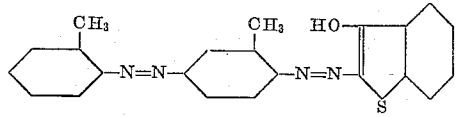

Said compound is separated by filtration and is then washed and dried thus obtaining a red-brown powder having a melting point of 217°–218° C.

By the use of paper chromatography (eluent: organic portion of the mixture butanol:acetic acid:water=5:1:4), there is observed a compact reddish spot which changes slowly to violet upon treatment with alkali.

This dye tinges polyethylene and polypropylene fibers a brilliant red color.

Similar results are also obtained when copolymeric ethylene-propylene fibers are dyed with this dye.

The intermediate dye, corresponding to the formula:

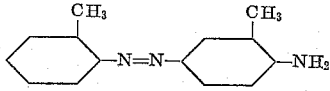

can only stain these fibers.

100 g. of a polypropylene or polyethylene fibre are dyed by immersing them into a dyeing bath kept at the boiling temperature and containing 3–4 litres of water, 0.1 to 0.3 g. of the above mentioned dye and a suitable dispersion agent (for instance sodium dinaphthaylmethane disulfonate). At the end of the dyeing, a saponification process is carried out at a temperature of 40–60° C. with a common detergent or by treatment with an alkaline bath containing 0.1 to 2 g./l. of hyposulphide.

Example 2

22.5 g. of 4-amino-3,2'-dimethylazobenzene are diazotized in any conventional manner and the diazo-azo-compound thus obtained is added to a solution of 17.5 g. of 1-phenyl-3-methyl-5-pyrazolene in 300 ml. of water, 14 g. of sodium hydroxide solution (36° Bé) and 30 g. of a 30% ammonia solution, while keeping the temperature at about 10° C.

The coupling is quickly completed. The disazodye obtained is washed and dried, thus obtaining a brown-yellow powder having a melting point of 170°–171° C. corresponding to the formula:

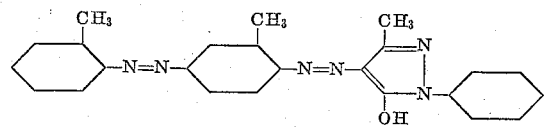

By the use of paper chromatography an elongated yellow-reddish spot is observed which changes to red upon treatment with alkali and also slightly to red upon treatment with acid.

By operating as in Example 1 with this dye, yellow-reddish polypropylene and polyethylene fibers are obtained.

Example 3

22.5 g. of 4-amino-3,2'-dimethylazobenzene are diazotized in any conventional manner and the diazo-azo-compound thus obtained is added to a solution of 22.0 g. of 1(3'-chloro-phenyl)3-methyl-5-pyrazolene in 300 ml. of water, 14 g. of sodium hydroxide solution (36° Bé.) and 30 g. of 30% ammonia solution, keeping the temperature at about 10° C.

The coupling is rapidly completed. The disazodye obtained is filtered, washed and dried thus obtaining a brown-yellow powder with a melting point of 226° C. corresponding to the formula:

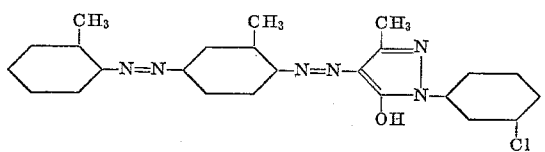

By use of paper chromatography an elongated yellow spot, changing slightly to red upon treatment with alkali, is observed.

By operating as in Example 1, with this dye yellow-reddish polypropylene and polyethylene fibers are obtained.

Example 4

22.5 g. of 4-amino-3,2'-dimethylazobenzene are diazotized in any conventional manner and the diazo-azo-compound thus obtained is added to a solution of 15.5 g. of N-methyl oxyindole in 250 ml. of water and 14 g. of conc. sodium hydroxide solution (36° Bé.), containing also 30 g. of 30% ammonia solution. The coupling is rapidly completed. A brown-yellow dye is obtained in the form of small masses, a little tacky due to the low melting point, having the formula:

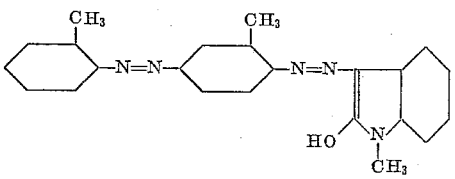

By use of chromatography the dye shows a pure yellow, very compact spot which does not change with acid and becomes darker with alkali.

By operating as in Example 1, yellow-reddish polyethylene and polypropylene fibers of good color characteristics are obtained.

Similar results are obtained upon replacing the 4-amino-3,2'-dimethylazobenzene with its 2,3'-dimethyl isomer.

Example 5

22.5 g. of 4-amino-3,2'-dimethylazobenzene are diazotized in any conventional manner and the diazo-azo-compound thus obtained is coupled as in Example 1, but using 21.5 g. of 3-oxy-6-ethoxythionaphthene instead of 16.5 g. of 3-oxy-thionaphthene.

The dye obtained has a melting point of 182°–183° C. and corresponds to the formula:

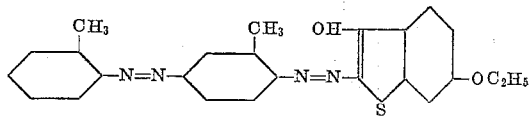

By the use of chromatography said dye shows a compact yellow-reddish spot which remains unaltered with acid treatment and changes to intense blue with alkali treatment.

The use of this dye makes it possible to dye polyethylene and polypropylene fibers with a brilliant scarlet color.

Example 6

27.9 g. of 4-amino-2-methyl-3'-trifluoromethyl-azobenzene are diazotized in 400 ml. of water and 35 g. of a hydrochloric acid solution (20° Bé.), then 7 g. of sodium nitrite dissolved in 20 g. of water are added, keeping the temperature below 10° C. The diazo-azo-compound thus obtained is coupled with a solution of 24.0 g. of 1(3'-trifluoro-methyl-phenyl)3-methyl-5-pyrazolone in 300 ml. of water and 14 g. of a conc. sodium hydroxide solution, containing also 30 g. of 30% ammonia.

The coupling takes place very rapidly and the diazo-compound is separated in a conventional manner. It is a brown powder with a melting point of 173°–174° C. corresponding to the formula:

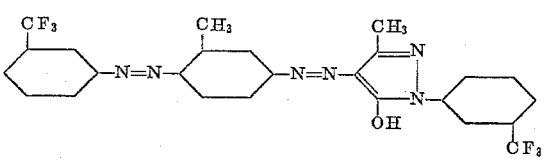

Chromatographically its behavior is similar to that of the dye described in Example 2, only it does not change with acid like the dye of Example 2. It tinges the polyethylene and polypropylene fibers a gold-yellow color.

Example 7

16.4 g. of 2-amino-6-methyl-benzothiazene are treated with 500 g. of 50% sulfuric acid, and while keeping the temperature at between −5° and −10° C., are diazotized with 6.9 g. of sodium nitrite.

The yellowish diazo-compound solution obtained is added to a solution containing 10.7 g. of m-toluidine in 500 ml. of water and 10 ml. of 50% sulfuric acid, and the mixture cooled to 0° C. The coupling is rather rapid and a violet precipitate is formed. When the reaction is ended the amino-azo-compound is filtered and washed. The paste is dispersed in 600 ml. of water and 40 g. of hydrochloric acid (20° Bé.). The dispersion is subsequently diazotized with 6.9 g. of sodium nitrite dissolved in a little water, while keeping the temperature at about 0° C.

The diazo-azo-compound solution is poured in a solution containing 14.5 g. of N,N-dimethyl-m-toluidine in 300 ml. of water and 15 g. of conc. hydrochloric acid. The mineral acidity is then neutralized with a 50% sodium acetate solution.

At the end of the coupling the dye is filtered and isolated in the form of a bluish powder having a melting point of 233°–234° C. corresponding to the formula:

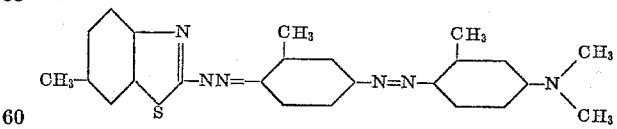

By means of chromatography a very elongated bluish spot is observed which does not change upon treatment with acid or alkali. Some traces of impurities are present.

By operating as in Example 1, polyethylene and polypropylene fibers are dyed a brown-red color.

Example 8

13.3 g. of 6-amino-indazole in 100 ml. of water and 35 g. of hydrochloric acid (20° Bé.) are diazotized with 6.5 g. of sodium nitrite (dissolved in water) at 0 to 5° C. The diazo-compound thus obtained is coupled with a solution containing 11.0 g. of m-toluidine in 200 g. of water and 14 g. of hydrochloric acid. Sodium acetate is added as a buffer.

At the end of the coupling the product is filtered and carefully washed. The aminoazo-derivative paste is dispersed in a solution containing 300 ml. of water and 40 g. of conc. hydrochloric acid and is diazotized with 7 g. of suitably dissolved sodium nitrite. After removing the nitrite excess, the diazo-azo-compound (partially in solution) is coupled with N,N-dimethyl-m-toluidine, by operating as in Example 7.

A dye with a melting point of 208°–209° C. and corresponding to the following formula is obtained:

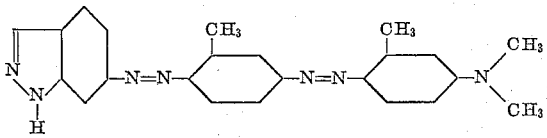

By the use of chromatography said dye shows a compact red spot, which is not sensitive to alkali but changes to violet with acid. The use of said dye makes it possible to tinge polyethylene and polypropylene fibers with a light orange color.

*Example 9*

22.5 g. of 4-amino-2,3'-dimethyl-azo-benzene are diazotized in any conventional manner and the diazo-azo-compound thus obtained is coupled with a solution containing 18.5 g. of acetacetanilide in 300 g. of water, 14 g. of sodium hydroxide (36° Bé.) and 25 g. of sodium acetate.

The temperature is kept at 0° to 5° C. until the end of the coupling and the product is filtered. A yellow powder is obtained which has a melting point of 173°–174° C. corresponding to the formula:

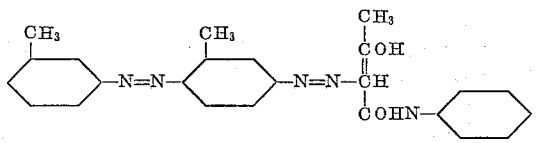

By chromatographic examination, this powder shows a single spot with a very pure yellow color which only after treatment with alkali changes to orange. The use of this diazo dye makes it possible to tinge the polyethylene and propylene fibers a yellow-greenish color.

*Example 10*

22.5 g. of 4-amino-2,3'-dimethyl-azo-benzene are diazotized in any conventional manner and the diazo-azo-compound thus obtained is coupled using a solution of 13.5 g. of 5-oxy-indazole in 250 ml. of water and 14 g. of sodium hydroxide (36° Bé.), containing also 30 g. of 30% ammonia. At the end of the coupling the diazodye obtained, corresponding to the formula:

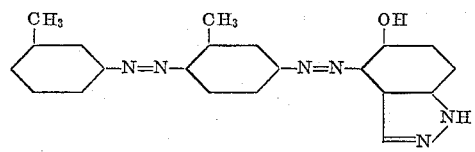

is filtered, washed and dried. The dark red powder has a melting point of 220°–221° C.

By chromatography it shows an intense pure red spot which only upon treatment with alkali changes to intense blue.

By operating according to Example 1, it is possible to dye polyethylene and polypropylene fibers a pink color.

*Example 11*

15.9 g. of 2-amino-4-methyl-5-nitro-thiazene are dissolved in 200 g. of a mixture of 15% propionic acid and 85% acetic acid and are diazotized at between 5° and 10° C. by adding the aforementioned solution to a previously prepared second solution containing 100 g. of nitrosyl sulfuric acid (containing 7 g. of nitrite) and 200 g. of an acetic acid-propionic acid mixture. The mass is kept for 1 to 2 hours at 10°–15° C. and the nitrite excess is destroyed with sulfamic acid. The diazo compound is then added to a coupling solution prepared by dissolving 11 g. of m-toluidine in 100 g. of an acetic acid-propionic acid mixture and cooling to 0° C.

The coupling takes place rapidly. The solution is discharged on to a sufficient supply of ice and the mineral acidity is neutralized with sodium acetate. The solution is then heated to 40° C. and the violet amino-monoazo-compound precipitate is filtered and carefully washed. 13.85 g. of the amino-azo-compound thus obtained are added to 250 ml. of water and 50 ml. of formamide, and diazotized in the presence of 35 g. of hydrochloric acid (20° Bé.) with 7.1 g. of sodium nitrite (dissolved in water), while keeping the temperature at 10°–15° C.

The diazo-azo-compound thus obtained is freed of the nitrite excess by addition of urea and is then coupled with a solution of 7.5 g. of N,N-dimethyl-m-toluidine in a solution of 150 ml. of water and 8 g. conc. hydrochloric acid. The neutralization of the mineral acidity with sodium acetate then follows. The dye obtained is filtered and carefully washed thus obtaining a dark powder with a melting point of 205°–207° C. having the formula:

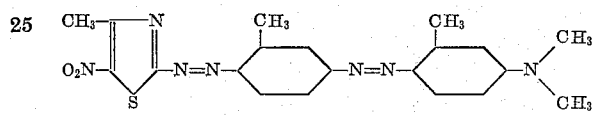

By the use of chromatography there is observed a single orange spot which does not change upon alkali treatment but does change to violet upon treatment with acid. By operating as in Example 1, polyethylene and polypropylene fibers are dyed a brown-orange color.

If the coupling of the diazo-azo-compound is not carried out using dimethyl-m-toluidine, but using a solution containing 7.5 g. of beta-naphthol, 200 ml. of water, 11 g. of sodium hydroxide (36° Bé.) and 16 g. of conc. ammonia, a dye is obtained which dyes the fibers a red color and has a melting point of 204°–205° C.

By the use of chromatography this latter dye shows a single red spot which does not change upon treatment with acid or alkali.

Variations can, of course, be made without departing from the spirit of this invention.

Having thus described the invention, what it is desired to secure by Letters Patent and what is claimed is:

1. A process for the direct dyeing of an olefin polymer which comprises contacting said polymer in an aqueous dye bath which is maintained at its boiling temperature with a polyazo dye having the following general formula:

$$X_1-R-N=N-R_1-N=N-R_2X$$

wherein R and $R_1$ each represents a member of the group consisting of unsubstituted phenyl groups and substituted phenyl groups substituted with at least one member of the group consisting of alkyl, halogen, nitro, trifluoromethyl, mono-alkyl substituted amino and di-alkyl substituted amino groups; $R_2$ represents a member of the group consisting of (a) unsubstituted heterocyclic groups selected from the group consisting of pyrazolone, indazole, thiazole, benzothiazole and thiaphene, (b) substituted heterocyclic groups consisting of said heterocyclic groups recited above in (a), which are substituted with a member from the group consisting of alkyl, aryl, oxyalkyl, halogen, nitro and trifluoromethyl groups, and (c) an open chain ketoenolic group capable of coupling with diazo compounds; X represents a member of the group consisting of hydroxyl groups positioned ortho to the —N=N— group, amino, mono-substituted amino and di-substituted amino groups substituted with a member from the group consisting of alkyl, cyanoalkyl and aryl groups; and $X_1$ represents a member of the group consisting of X and H.

2. A process according to claim 1, wherein the olefin polymer is selected from the group consisting of homopolymers of ethylene, homopolymers of propylene and copolymers of ethylene and propylene.

3. A process according to claim 1, wherein the polyazo dye has the following formula:

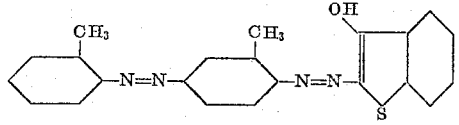

4. A process according to claim 1, wherein the polyazo dye has the following formula:

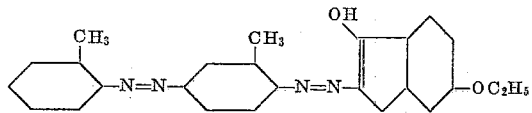

5. A process according to claim 1, wherein the polyazo dye has the following formula:

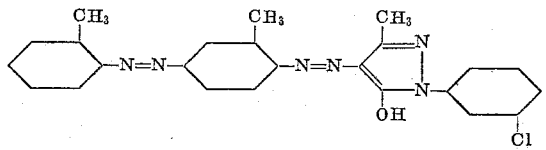

6. A process according to claim 1, wherein the polyazo dye has the following formula:

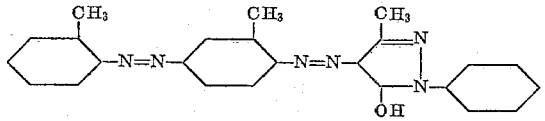

7. A process according to claim 1, wherein the polyazo dye has the following formula:

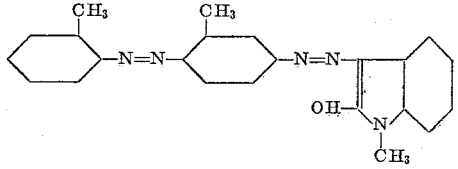

8. A process according to claim 1, wherein the polyazo dye has the following formula:

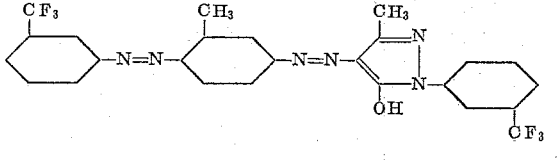

9. A process according to claim 1, wherein the polyazo dye has the following formula:

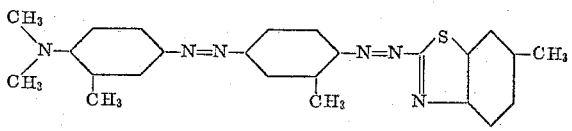

10. A process according to claim 1, wherein the polyazo dye has the following formula:

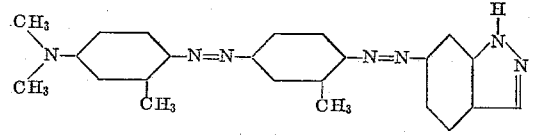

11. A process according to claim 1, wherein the polyazo dye has the following formula:

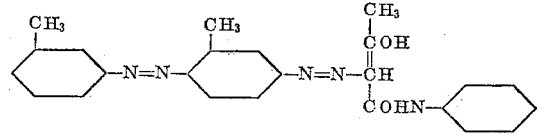

12. A process according to claim 1, wherein the polyazo dye has the following formula:

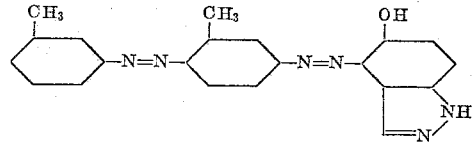

13. A process according to claim 1, wherein the polyazo dye has the following formula:

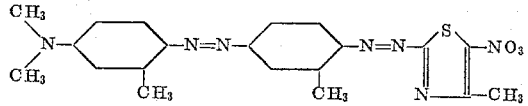

References Cited in the file of this patent

UNITED STATES PATENTS

| | | |
|---|---|---|
| 2,638,403 | Stead et al. | May 12, 1953 |
| 2,782,185 | Merian | Feb. 19, 1957 |
| 2,892,671 | Alsberg et al. | June 30, 1959 |
| 2,954,371 | Liechti | Sept. 27, 1960 |
| 2,989,358 | Jurgeleit | June 20, 1961 |
| 3,004,821 | Gano | Oct. 17, 1961 |
| 3,037,974 | Kracker et al. | June 5, 1962 |
| 3,045,004 | Gaetani | July 17, 1962 |
| 3,049,532 | Gaetani | Aug. 14, 1962 |

OTHER REFERENCES

Colour Index, 2nd Ed., 1956, The Amer. Assoc. of Textile Chemists and Colorists, Lowell Tech. Inst., Lowell, Mass., vol. 3, p. 3125, entry 20000.